(12) United States Patent
Viswanath et al.

(10) Patent No.: US 7,099,930 B1
(45) Date of Patent: Aug. 29, 2006

(54) SYSTEM USING TRUNCATED SUPERIOR RESOURCE NAME AND UNIQUE COUNTER NUMBER OBTAINED FROM A GLOBAL COUNTER FOR GENERATING A UNIQUE SUBORDINATE RESOURCE NAME

(75) Inventors: Kaartik Viswanath, San Jose, CA (US); Stanley Ratliff, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 771 days.

(21) Appl. No.: 09/750,404

(22) Filed: Dec. 28, 2000

(51) Int. Cl.
*G06F 15/177* (2006.01)

(52) U.S. Cl. ........................ 709/220; 709/245

(58) Field of Classification Search ............... 709/223, 709/226, 220, 245
See application file for complete search history.

(56) References Cited

U.S. PATENT DOCUMENTS

| | | | |
|---|---|---|---|
| 5,812,793 A | * | 9/1998 | Shakib et al. ............... 709/201 |
| 5,845,087 A | | 12/1998 | Trehus |
| 6,122,276 A | | 9/2000 | Boe et al. |
| 6,128,662 A | | 10/2000 | Bolton et al. |
| 6,131,117 A | | 10/2000 | Clark et al. |
| 6,519,742 B1 | * | 2/2003 | Falk .............................. 716/3 |

OTHER PUBLICATIONS

Cisco System Inc., TN3270 Server Implementation, Jan. 22, 1999, pp. 13 and 32.*
Cisco System Inc., Networkers, 1998, slide #19.*

* cited by examiner

*Primary Examiner*—Le Hien Luu
(74) *Attorney, Agent, or Firm*—Cesari and McKenna LLP

(57) ABSTRACT

A method for generating a unique subordinate resource name is disclosed where the method includes the steps of identifying a subordinate resource and the name of a related superior resource, truncating the superior resource name to form a truncated name, obtaining a counter number from a global counter, and appending the counter number to the truncated name to form an appended name which is assigned to the subordinate resource.

28 Claims, 4 Drawing Sheets

SYSTEM USING TRUNCATED SUPERIOR RESOURCE NAME AND UNIQUE COUNTER NUMBER OBTAINED FROM A GLOBAL COUNTER FOR GENERATING A UNIQUE SUBORDINATE RESOURCE NAME

BACKGROUND OF THE INVENTION

1. Field of the Invention

The present invention relates to computer network systems which include mainframe devices and, more particularly, to a method for providing unique names to subordinate resources addressed by the mainframe device.

2. Background Information

The System Network Architecture (SNA) was developed by IBM as a means to interconnect one or more mainframe devices with computer terminals, printers, personal computers, and other devices, denoted as Physical Units (PUs). A PU may include one or more Logical Units (LUs). In the present state of the art, the LUs communicate with the mainframe device in the SNA system by means of IBM's Virtual Telecommunications Access Method (VTAM).

In the SNA system, each PU is assigned a name obtained from a resource definition file resident in the local directory of the mainframe device. The term 'resource' is used herein to refer to any network accessible unit (NAU), such as a PU, an LU, or a control point, that can be represented in the local directory. The local directory resource definition file thus contains the logical name, or resource name, and node identification for each NAU in the SNA system. In particular, the TN3270 server utilizes resource names of eight characters in length, in accordance with SNA/VTAM standards, with the requirement that each resource name be unique. By utilizing resource names in the network, an end user can begin a session as an LU without needing to know the locations of the network resources.

There has always been a problem when attempting to derive subordinate resource names from the name of the corresponding superior resource. Currently, there is no scheme by which, when attempting to do such derivation, one can assure that unique subordinate names are generated.

The TN3270 server allows the user/administrator to specify a 'user seed' to be used for subordinate resource names. If a user seed is not specified, a name seed is provided by using the first five characters of the PU name. Either seed is then used to create names for the subordinate resources by appending to the seed an index value ranging from 1 to 255.

Such conventional derivation methods for name seeds cause clashes of the subordinate resource names in the name space. By way of example, a clash will most likely result when the first five characters in the PU names remain invariant.

What is needed is a method for deriving subordinate resource names which insures that the derived names are unique.

SUMMARY OF THE INVENTION

The aforementioned shortcomings of the present art are addressed by a method for generating a unique subordinate resource name. The disclosed method comprises the steps of identifying a subordinate resource and a related superior resource; ascertaining the name of the superior resource; truncating the superior resource name to form a truncated name; obtaining a counter number from a global counter; appending the counter number to the truncated name to form an appended name; and assigning the appended name to the subordinate resource. In an alternative embodiment, the method includes the steps of identifying the subordinate resource and the related superior resource; ascertaining the name of the superior resource; obtaining a counter number of n digits from the global counter; substituting the counter number for n characters in the superior resource name to form a derived name; and assigning the derived name to the subordinate resource.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
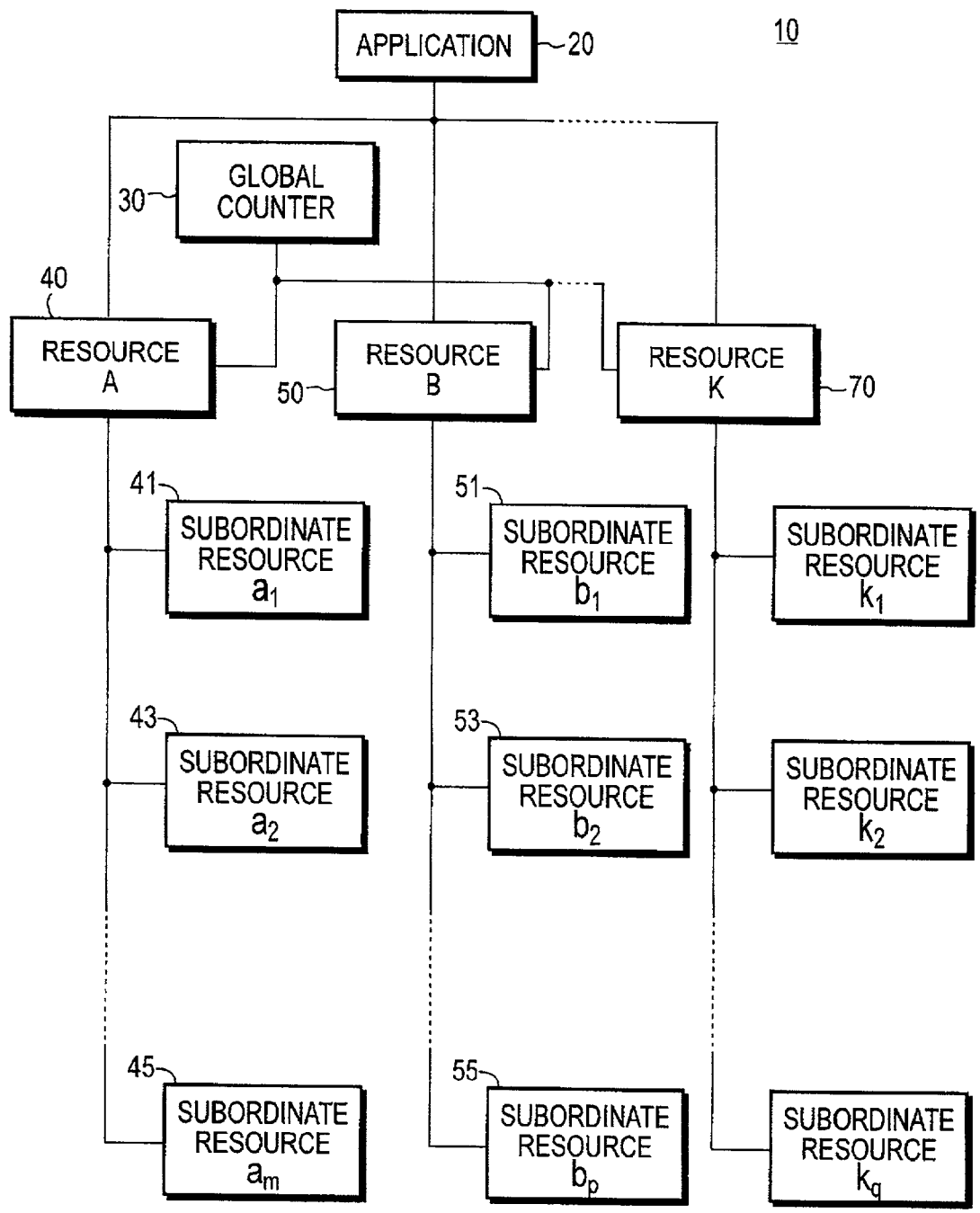
FIG. 1 is a functional representation of a computer system network in accordance with the present invention.

There is shown in FIG. 1 a computer system network 10 including an application 20 utilized by one or more resources. In the illustration, the application 20 is accessed by a first resource 40 and a second resource 50 through a $k^{th}$ resource 70. There may be one or more resources subordinate to each of the resources 40, 50, and 70. In the example provided, the first resource 40 includes a first subordinate resource 41 ($a_1$) and a second subordinate resource 43 ($a_2$) through an $m^{th}$ subordinate resource 45 ($a_m$). Similarly, the second resource 50 includes a first subordinate resource 51 ($b_1$) and a second subordinate resource 53 ($b_2$) through a $p^{th}$ subordinate resource 55 ($b_p$). A global counter 30 communicates with all of the resources 40 and 50 through 70.

Figure 2:
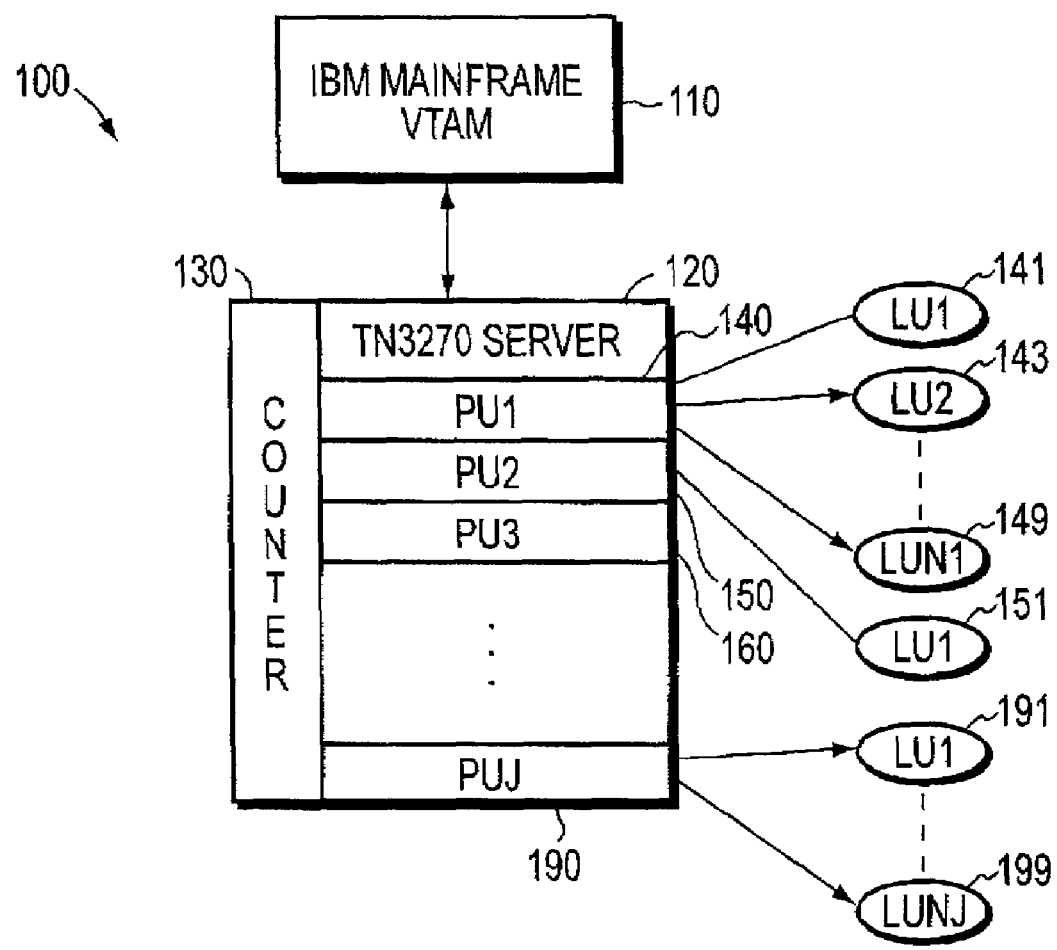
FIG. 2 is a diagrammatical representation of a portion of the computer system network of FIG. 1.

In a preferred embodiment, a computer system network 100 includes a mainframe device 110 and a server 120, as shown in FIG. 2. Preferably, the computer system network 100 conforms to SNA/VTAM standards. The mainframe device 110 communicates with the server 120, which is preferably a TN3270 server. The server 120 communicates with a plurality of resources, here denoted as a first physical unit 140 (PU1), a second physical unit 150 (PU2), and a third physical unit 160 (PU3) through a $j^{th}$ physical unit 190 (PUJ). Each physical unit 140 through 190 includes one or more logical units. In the example provided, the first physical unit 140 includes a logical unit 141 (LU1) and a logical unit 143 (LU2) through a logical unit 149 (LUN1). The second physical unit 150 includes a logical unit 151 (LU1). The $j^{th}$ physical unit 190 includes a logical unit 191 (LU1) through a logical unit 199 (LUNJ).

In a conventional resource-naming system, the first physical unit 140 may be assigned a name such as 'HERESPU1' and the second physical unit 150 may have the name 'HERESPU2.' In a conventional subordinate name derivation procedure, the subordinate name seed is derived from the first five characters, 'HERES,' of the name of the first physical unit 140. The resulting logical unit names derived from the name seed 'HERES' will be 'HERES001' and 'HERES002' through 'HERES255.' The logical unit 141, for example, will then have the name 'HERES001.'

However, since the subordinate name seed derived from the first five characters of the name of the second physical unit 150 will also be 'HERES,' the logical unit 151 will also have the name 'HERES001.' That is, two different subordinate resources, 141 and 151, are both assigned the same resource name. This violates the SNA/VTAM requirement that each resource name be unique.

Figure 3:
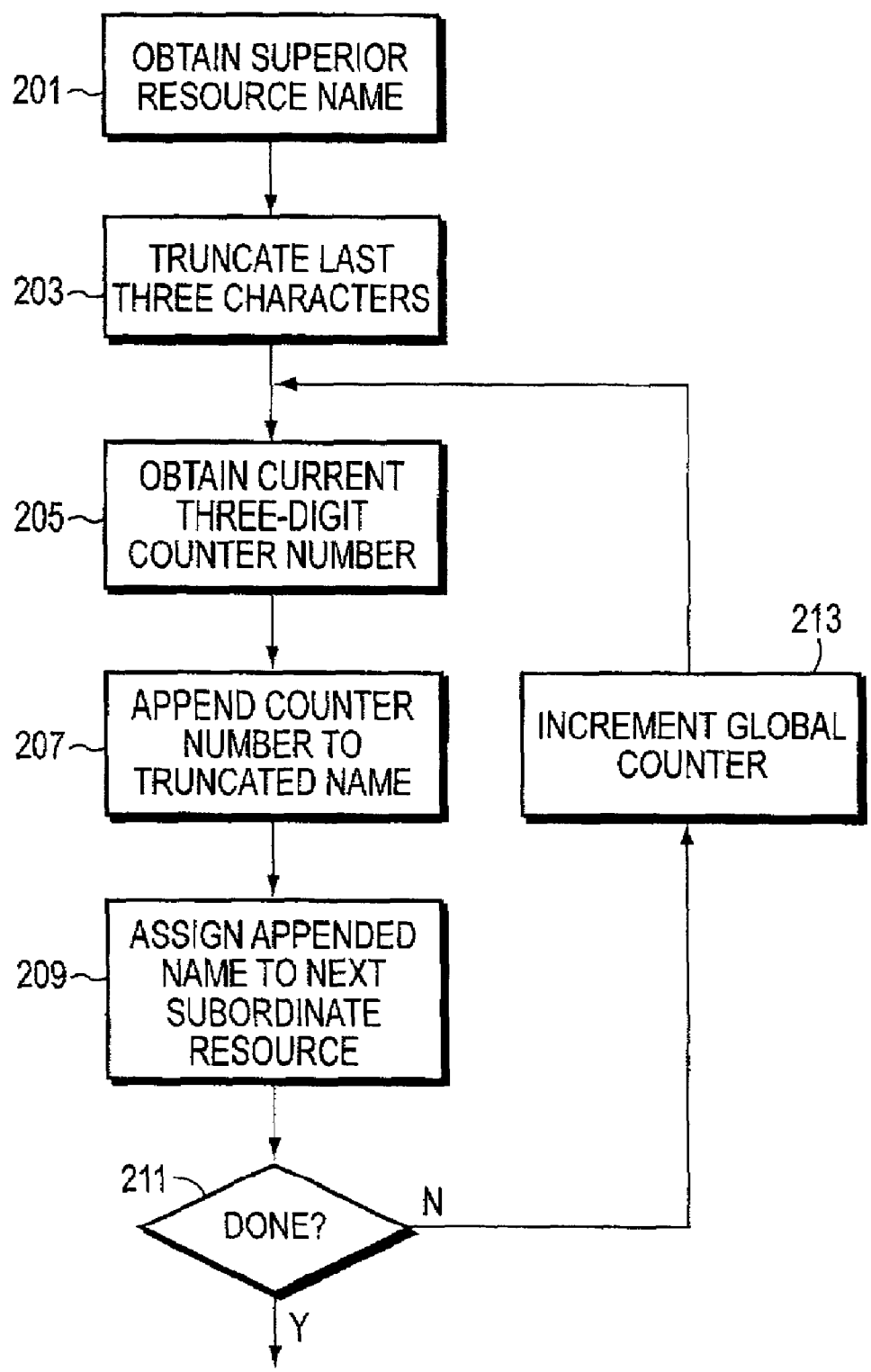
FIG. 3 is a flow diagram illustrating a preferred embodiment of the inventive process.

The disclosed method is best explained with reference to FIG. 3 in which the global counter 130 is utilized to provide a three-digit prefix for inclusion with a retrieved resource name. In a preferred embodiment, the relevant resource name is obtained, in box 201. The last three characters of the resource name is truncated, in box 203, to provide the name seed. For example, truncation of the resource name of the first physical unit 140, 'HERESPU1' will yield 'HERES.' The current counter number is obtained from the global counter 130, in box 205.

Initially, the counter 130 is set to '000.' This number is appended to the truncated resource name, in box 207. The appended name is assigned to the subordinate resource, in box 209. For the above example, the derived name provided for the logical unit 141 will be '000HERES.' If additional subordinate resource names are to be derived, at box 211, the global counter 130 is incremented, at box 213, and the process returns to obtain the new, current global counter value, in box 205. In the example, the global counter 130 is incremented to '001' and the derived name for the second logical unit 143 will be '001HERES.'

In an alternative method of deriving resource names, a global counter providing four-digit counter numbers is used. Accordingly, the last four characters of the resource name are dropped, and the four-digit counter number is appended to the truncated resource name. Using the above example in which the first physical unit 140 has been assigned 'HERESPU1' and the second physical unit 150 has been assigned 'HERESPU2,' the last four characters are truncated to give 'HERE,' and the corresponding subordinate names for the first physical unit 140 and the second physical unit 150 will be '000HERE' and '0001HERE,' respectively.

It should be understood that the disclosed method is not limited to use with a counter providing three- or four-digit counter numbers, but may be advantageously used with counters providing five-digit counter numbers. Using the physical unit names of the above examples, derived resource names of "00000HER' and '00001HER' may be obtained, for example.

In yet other alternative embodiments, counter numbers provided by a three-digit counter may be substituted for three sequential characters anywhere in the character strings of the physical unit names. For example, the second, third, and fourth characters can be replaced by the global counter to give the subordinate name 'H000PU1' to the first physical unit 140 and the subordinate name 'H001SPU2' to the second physical unit 150. Or, the, third, fourth, and fifth characters can be replaced to give the subordinate name 'HE000PU1' to the first physical unit 140 and the subordinate name 'HE001PU2' to the second physical unit 150. Thus, all applications using these resource names as references to generate names will differ in at least three of the first five characters. In general, any three of the eight characters in a physical unit name can be replaced by the three-digit counter number. However, in a computer system network including a TN3270 server, the last three characters in a physical unit name are not replaced.

Figure 4:
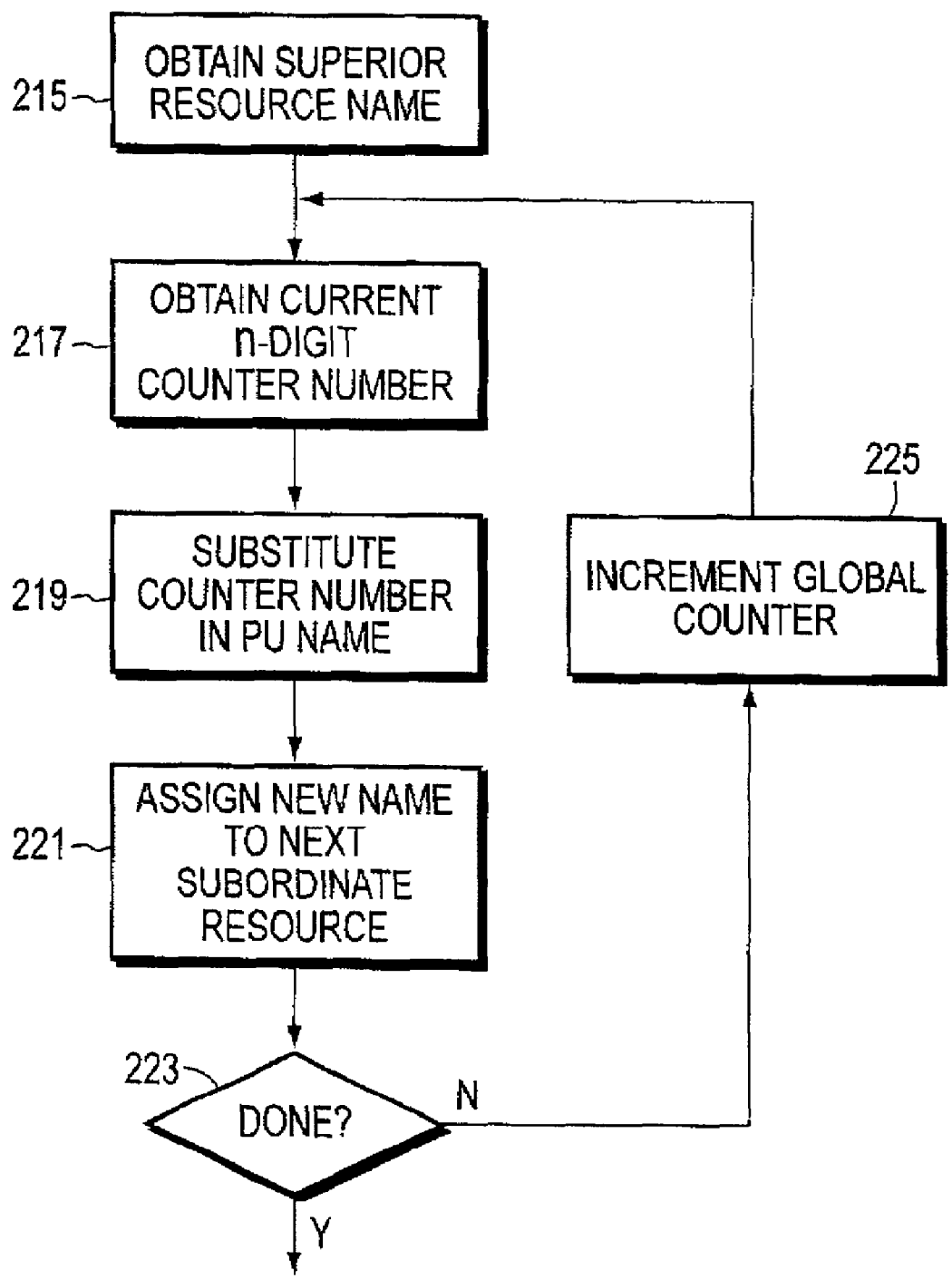
FIG. 4 is a flow diagram illustrating an alternative embodiment to the method of FIG. 3.

These alternative methods are illustrated in FIG. 4 where in which the superior resource name is obtained, in box 215, and the global counter 130 is utilized to provide an n-digit counter number, in box 217. The current counter number is substituted in the physical unit name, in box 219. The resulting name is assigned to the subordinate resource, in box 221. If additional subordinate resource names are to be derived, at box 223, the global counter 130 is incremented, at box 225, and the process returns to obtain the new, current global counter value, in box 217.

What is claimed is:

1. A method for generating a unique subordinate resource name, said method comprising the steps of:
   identifying a first subordinate resource and a related first superior resource;
   ascertaining the name of said first superior resource;
   truncating said first superior resource name to form a first truncated name;
   obtaining a first counter number from a global counter;
   appending said first counter number to said first truncated name to form a first appended name;
   assigning said first appended name to said first subordinate resource;
   identifying a second subordinate resource and a related second superior resource;
   ascertaining the name of said second superior resource;
   truncating said second superior resource name to form a second truncated name;
   incrementing said global counter to obtain a second counter number;
   appending said second counter number to said second truncated name to form a second appended name; and
   assigning said second appended name to the second subordinate resource.

2. The method of claim 1 wherein said step of truncating comprises:
   a step of dropping the last n characters of said first and second superior resource names, where $n \geq 3$.

3. The method of claim 2 wherein said counter numbers are at least three digits in length.

4. A method for generating a unique subordinate resource name, said method comprising the steps of:
   identifying a first subordinate resource and a related first superior resource;
   ascertaining the name of said first superior resource;
   obtaining a first counter number of n digits from a global counter;
   substituting said first counter number for n characters in said first superior resource name to form a first name;
   assigning said first name to said first subordinate resource;
   identifying a second subordinate resource and a related second superior resource;
   ascertaining the name of said second superior resource;
   incrementing said global counter to obtain a second counter number; and substituting said second counter number in said second superior resource name to form a second name; and
   assigning said second name to the second subordinate resource.

5. The method of claim 4 wherein $n \geq 3$.

6. A method for generating unique subordinate resource names, comprising:
   identifying one or more subordinate resources, each of the one or more subordinate resources related to one of one or more superior resources;
   truncating a name of the one or more superior resources;
   generating a unique identification (ID) number from a global counter; and
   naming each of the one or more subordinate resources as a combination of the truncated name of its related superior resource and the identification (ID) number, the ID number unique to each of the one or more subordinate resources across all of the one or more superior resources.

7. The method of claim 6, further comprising:
incrementing the global counter for each subordinate resource to obtain a unique counter number.

8. The method of claim 6, further comprising:
truncating n characters of the superior resource name, where n is greater than or equal to three.

9. The method of claim 6, further comprising:
using one or more physical units (PUs) as the one or more superior resources.

10. The method of claim 6, further comprising:
using one or more logical units (LUs) as the one or more subordinate resources.

11. A system, comprising:
one or more superior resources, each of the one or more superior resources having a name;
a global counter to create a counter number the counter number to be used as a unique ID number; and
one or more subordinate resources, each of the one or more subordinate resources related to one of the one or more superior resources, each of the one or more subordinate resources being named as a combination of a truncated name of its related superior resource and the identification (ID) number, the ID number unique to each of the one or more subordinate resources across all of the one or more superior resources.

12. The system of claim 11, further comprising:
the global counter incremented for each subordinate resource to obtain a unique counter number.

13. The system of claim 11, further comprising:
the truncated name formed by truncating n characters of the superior resource name, where n is greater than or equal to three.

14. The system of claim 11, further comprising:
a server in communicating relationship with the one or more superior resources.

15. The system of claim 14, further comprising:
a computer network for use as the communicating relationship.

16. The system of claim 11, further comprising:
one or more physical units (PUs) as the one or more superior resources.

17. The system of claim 11, further comprising:
one or more logical units (LUs) as the one or more subordinate resources.

18. A system, comprising:
means for identifying one or more subordinate resources, each of the one or more subordinate resources related to one of one or more superior resources;
means for truncating a name of the one or more superior resources;
means for generating a unique identification (ID) number from a global counter; and
means for naming each of the one or more subordinate resources as a combination of the truncated name of its related superior resource and the identification (ID) number, the ID number unique to each of the one or more subordinate resources across all of the one or more superior resources.

19. A computer readable media, comprising: the computer readable media containing instructions for execution on a processor for the practice of the method of,
identifying one or more subordinate resources, each of the one or more subordinate resources related to one of one or more superior resources;
truncating a name of the one or more superior resources;
generating a unique identification (ID) number from a global counter; and
naming each of the one or more subordinate resources as a combination of the truncated name of its related superior resource and the identification (ID) number, the ID number unique to each of the one or more subordinate resources across all of the one or more superior resources.

20. A method for generating a unique subordinate resource name, said method comprising the steps of:
identifying a subordinate resource and a related superior resource;
ascertaining the name of said superior resource;
truncating said superior resource name to form a truncated name;
obtaining a counter number from a global counter;
selecting a unique number by the global counter for each subordinate resource of a plurality of subordinate resources related to the superior resource;
appending said unique number to said truncated name to form an appended name; and
assigning said appended name to said subordinate resource.

21. The method of claim 20 wherein said step of truncating comprises:
dropping the last n characters of said superior resource name, where $n \geq 3$.

22. The method of claim 20, further comprising:
incrementing the global counter for each additional subordinate resource related to said superior resource to obtain a unique counter number.

23. The method of claim 20, further comprising:
truncating n characters of the superior resource name.

24. An apparatus to generate a unique subordinate resource name, said apparatus comprising the steps of:
means for identifying a subordinate resource and a related superior resource;
means for ascertaining the name of said superior resource;
means for truncating said superior resource name to form a truncated name;
means for obtaining a counter number from a global counter;
means for selecting a unique number by the global counter for each subordinate resource of a Plurality of subordinate resources related to the superior resource:
means for appending said unique number to said truncated name to form an appended name; and
means for assigning said appended name to said subordinate resource.

25. The apparatus of claim 24 wherein said step of truncating comprises:
means for dropping the last n characters of said superior resource name, where $n \geq 3$.

26. The apparatus of claim 24, further comprising:
means for incrementing the global counter for each additional subordinate resource related to said superior resource to obtain a unique counter number.

27. The apparatus of claim 24, further comprising:
means for truncating n characters of the superior resource name.

28. A server, comprising:
- a first superior resource, the superior resource selected from a plurality of superior resources, the first superior resource having a name;
- a fist subordinate resource related to the superior resource, the first subordinate resource selected from a plurality of subordinate resources;
- means for truncating said first superior resource name to form a truncated name;
- a global counter to produce a globally unique number; said global counter selecting said globally unique number for each subordinate resource of said plurality of subordinate resources;
- means for appending said globally unique number to said truncated name to form an appended name; and
- means for assigning said appended name to said first subordinate resource to generate a unique subordinate resource name for said first subordinate resource.

* * * * *